United States Patent
Foster et al.

(10) Patent No.: US 9,284,629 B2
(45) Date of Patent: Mar. 15, 2016

(54) ZIRCONIUM ALLOYS WITH IMPROVED CORROSION/CREEP RESISTANCE DUE TO FINAL HEAT TREATMENTS

(75) Inventors: John P. Foster, Bluffton, SC (US); David Colburn, Ogden, UT (US); Robert Comstock, Irwin, PA (US); Terrence Cook, Riverdale, UT (US); Mats Dahlback, Vasteras (SE); Anand Garde, Columbia, SC (US); Pascal Jourdain, Vasteras (SE); Ronald Kesterson, Columbia, SC (US); Michael McClarren, New Alexandria, PA (US); Dianna Lynn Svec Nuhfer, Pittsburgh, PA (US); Guirong Pan, Sumter, SC (US); Jonna Partezana Mundorff, Finleyville, PA (US); Hsiang Ken Yueh, Charlotte, NC (US); James A. Boshers, Marshville, NC (US); Penney File, Lusby, MD (US); Bethany Boshers, legal representative, Matthews, NC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 283 days.

(21) Appl. No.: 13/161,563

(22) Filed: Jun. 16, 2011

(65) Prior Publication Data

US 2011/0293466 A1 Dec. 1, 2011

Related U.S. Application Data

(60) Continuation-in-part of application No. 12/697,322, filed on Feb. 1, 2010, now abandoned, which is a division of application No. 11/087,844, filed on Mar. 23, 2005, now abandoned.

(Continued)

(51) Int. Cl.
 C22C 16/00 (2006.01)
 C22F 1/18 (2006.01)
 G21C 3/07 (2006.01)

(52) U.S. Cl.
 CPC ............... *C22C 16/00* (2013.01); *C22F 1/186* (2013.01); *G21C 3/07* (2013.01); *Y02E 30/40* (2013.01)

(58) Field of Classification Search
 CPC ............ C22C 16/00; C22F 1/186; C22F 1/18
 USPC ......................................... 148/672; 420/423
 See application file for complete search history.

(56) References Cited

U.S. PATENT DOCUMENTS 3,085,059 A 4/1963 Burnham, Jr.
4,212,686 A 7/1980 Lunde et al.
(Continued)

FOREIGN PATENT DOCUMENTS

EP 0425465 A1 5/1991
WO WO 0161062 A1 8/2001
WO WO 2005094504 10/2005

OTHER PUBLICATIONS

Sabol et al., "Development of a Cladding Alloy for High Burnup" Zirconium in the Nuclear Industry: Eighth International Symposium, L.F. Van Swan and C.M. Euckens, Eds., American Society for Testing and Materials, ASTM STP 1023, Philadelphia, 1989. pp. 227-244.

(Continued)

*Primary Examiner* — Jie Yang
(74) *Attorney, Agent, or Firm* — Joseph C. Spadacene; Westinghouse Electric Company LLC

(57) ABSTRACT

Articles, such as tubing or strips, which have excellent corrosion resistance to water or steam at elevated temperatures, are produced from alloys having 0.2 to 1.5 weight percent niobium, 0.01 to 0.6 weight percent iron, and optionally additional alloy elements selected from the group consisting of tin, chromium, copper, vanadium, and nickel with the balance at least 97 weight percent zirconium, including impurities, where a necessary final heat treatment includes one of i) a SRA or PRXA (15-20% RXA) final heat treatment, or ii) a PRXA (80-95% RXA) or RXA final heat treatment.

4 Claims, 11 Drawing Sheets

Related U.S. Application Data

(60) Provisional application No. 60/555,600, filed on Mar. 23, 2004, provisional application No. 60/564,416, filed on Apr. 22, 2004, provisional application No. 60/564,417, filed on Apr. 22, 2004, provisional application No. 60/564,469, filed on Apr. 22, 2004.

(56) References Cited

U.S. PATENT DOCUMENTS

| | | |
|---|---|---|
| 4,562,713 A | 1/1986 | Kondoh |
| 4,648,912 A | 3/1987 | Sabol et al. |
| 4,649,023 A | 3/1987 | Sabol et al. |
| 4,775,508 A | 10/1988 | Sabol et al. |
| 4,814,136 A | 3/1989 | Sabol et al. |
| 4,938,920 A | 7/1990 | Garzarolli et al. |
| 4,963,323 A | 10/1990 | Matsuo et al. |
| 4,992,240 A | 2/1991 | Komatsu et al. |
| 5,017,336 A | 5/1991 | Matsuo et al. |
| 5,023,048 A | 6/1991 | Mardon et al. |
| 5,112,573 A | 5/1992 | Foster et al. |
| 5,125,985 A | 6/1992 | Foster et al. |
| 5,211,774 A | 5/1993 | Garde et al. |
| 5,230,758 A | 7/1993 | Foster et al. |
| 5,254,308 A | 10/1993 | Garde et al. |
| 5,266,131 A | 11/1993 | Foster et al. |
| 5,341,407 A | 8/1994 | Rosenbaum et al. |
| 5,366,690 A | 11/1994 | Garde |
| 5,373,541 A | 12/1994 | Mardon et al. |
| 5,519,748 A | 5/1996 | Adamson et al. |
| 5,560,790 A | 10/1996 | Nikulina et al. |
| 5,618,356 A | 4/1997 | Adamson et al. |
| 5,620,536 A | 4/1997 | Dahlback |
| 5,648,995 A | 7/1997 | Mardon et al. |
| 5,681,404 A | 10/1997 | Adamson et al. |
| 5,805,656 A | 9/1998 | Adamson |
| 5,862,194 A | 1/1999 | Fujieda et al. |
| 5,887,045 A | 3/1999 | Mardon et al. |
| 5,912,935 A | 6/1999 | Isobe et al. |
| 5,940,464 A | 8/1999 | Mardon et al. |
| 5,972,288 A | 10/1999 | Jeong et al. |
| 5,985,211 A | 11/1999 | Jeong et al. |
| 6,014,418 A | 1/2000 | Isobe et al. |
| 6,125,161 A | 9/2000 | Isobe et al. |
| 6,261,516 B1 | 7/2001 | Jeong et al. |
| 6,514,360 B2 | 2/2003 | Jeong et al. |
| 6,544,361 B1 | 4/2003 | Diz et al. |
| 6,776,957 B1 | 8/2004 | Nikulina et al. |
| 6,811,746 B2 | 11/2004 | Jeong et al. |
| 6,863,745 B1 | 3/2005 | Charquet et al. |
| 6,902,634 B2 | 6/2005 | Jeong et al. |
| 7,292,671 B1 | 11/2007 | Dahlback et al. |
| 7,473,329 B2 | 1/2009 | Dahlback et al. |
| 7,625,453 B2 | 12/2009 | Eucken |
| 7,627,075 B2 | 12/2009 | Charquet et al. |
| 7,630,470 B2 | 12/2009 | Barberis et al. |
| 7,715,518 B2 * | 5/2010 | Dahlback et al. ............. 376/409 |
| 7,738,620 B2 | 6/2010 | Barberis et al. |
| 7,763,132 B2 | 7/2010 | Barberis et al. |
| 2004/0118491 A1 | 6/2004 | Mardon et al. |
| 2006/0177341 A1 | 8/2006 | Jeong et al. |
| 2006/0225815 A1 | 10/2006 | Garzarolli et al. |
| 2006/0243358 A1 | 11/2006 | Colburn et al. |
| 2007/0153963 A1 | 7/2007 | Lutz et al. |
| 2008/0131306 A1 | 6/2008 | Jeong et al. |
| 2008/0192880 A1 | 8/2008 | Jeong et al. |
| 2009/0071579 A1 | 3/2009 | Hallstadius |
| 2009/0285350 A1 | 11/2009 | Cantonwine et al. |
| 2010/0126636 A1 | 5/2010 | Barberis et al. |
| 2010/0128834 A1 | 5/2010 | Colburn et al. |

OTHER PUBLICATIONS

Sabol et al., "In-reactor Corrosion Performance of ZIRLO and Zircaloy-4" Zirconium in the Nuclear Industry: Tenth International Symposium, A.M. Garde and E.R. Bradley Eds., American Society for Testing and Materials, ASTM STP 1245, Philadelphia, 1994. pp. 724-744.

Davis et al., "ASM International Handbook," vol. 2, Oct. 1990, pp. 661-669.

Mardon et al., "Influence of Composition and Fabrication Process on Out-of-Pile and In-Pile Properties of M5 Alloy," Zirconium in the Nuclear Industry, Twelfth International Symposium, ASTM STP 1354, pp. 505-522, West Conshohocken, PA 2000.

Pan et al., "Advanced Material for PWR Application: AXIOM™," Proceedings of 2010 LWR Fuel Performance/Top Fuel/WRFPM, pp. 1-9, Sep. 26-29, 2010, Orlando, FL.

Rudling et al., "Corrosion Performance of Zircaloy-2 and Zircaloy-4 PWR Fuel Cladding," Zirconium in the Nuclear Industry: Eight International Symposium, ASTM STP 1023, L. F. Van Swam and C. M. Eucken, eds. American Society for Testing and Materials, Philadelphia, 1989, pp. 213-226.

"Recrystallization (Metallurgy)" Wikipedia, http/www.en.wikipedia.org/wiki/recrystallization (metallurgy).

International Preliminary Report on Patentability for PCT/US2012/038471 dated Dec. 17, 2013 (Form PCT/IB/373, PCT/ISA/237).

Supplementary Partial European Search Report dated Nov. 4, 2014 for EP12800643.

* cited by examiner

ZIRCONIUM ALLOYS WITH IMPROVED CORROSION/CREEP RESISTANCE DUE TO FINAL HEAT TREATMENTS

CROSS-REFERENCE TO RELATED APPLICATIONS

The present application is a continuation-in-part application which claims priority from all the following applications: U.S. patent application Ser. No. 12/697,322, filed Feb. 1, 2010, which is a divisional application of U.S. Ser. No. 11/087,844, filed Mar. 23, 2005, which claims priority from U.S. Provisional Application Ser. No. 60/555,600, filed Mar. 23, 2004, and Provisional Application Nos. 60/564,416, 60/564,417 and 60/564,469, each filed Apr. 22, 2004, the disclosures of all of which are incorporated herein by reference.

BACKGROUND OF THE INVENTION

1. Field of the Invention

The present invention generally relates to a zirconium based alloy usable for the formation of strips and tubing for use in nuclear fuel reactor assemblies. Specifically, the invention relates to new technology that improves the in-reactor corrosion and/or the in-reactor creep of Zr—Nb based alloys by an essential and critical final heat treatment. The invention was applied to Zr—Nb based alloys that were developed by alloying element additions and exhibit improved corrosion resistance in water based reactors under elevated temperatures.

2. Description of the Prior Art

In the development of nuclear reactors, such as pressurized water reactors and boiling water reactors, fuel designs impose significantly increased demands on all of the fuel components, such as cladding, grids, guide tubes, and the like. Such components are conventionally fabricated from zirconium-based alloys commercially titled ZIRLO, corrosion resistant alloys that contain about 0.5-2.0 wt. % Nb; 0.9-1.5 wt. % Sn; and 0.09-0.11 wt. % of a third alloying element selected from Mo, V, Fe, Cr, Cu, Ni, or W, with the rest Zr, as taught in U.S. Pat. No. 4,649,023 (Sabol et al.). That patent also taught compositions containing up to about 0.25 wt. % of the third alloying element, but preferably about 0.1 wt %. Sabol et al., in "Development of a Cladding Alloy for High Burnup" *Zirconium in the Nuclear Industry: Eighth International Symposium*, L. F. Van Swan and C. M. Eucken, Eds., American Society for Testing and Materials, ASTM STP 1023, Philadelphia, 1989. pp. 227-244, reported improved properties of corrosion resistance for ZIRLO (0.99 wt. % Nb, 0.96 wt. % Sn, 0.10 wt. % Fe, remainder primarily zirconium) relative to Zircaloy-4.

There have been increased demands on such nuclear core components, in the form of longer required residence times and higher coolant temperatures, both of which cause increase alloy corrosion. These increased demands have prompted the development of alloys that have improved corrosion and hydriding resistance, as well as adequate fabricability and mechanical properties. Further publications in this area include U.S. Pat. No. 5,940,464; 6,514,360 (Mardon et al. and Jeong et al.) and Reexamination Certificate U.S. Pat. No. 5,940,464 C1 (both Mardon et al.), and the paper "Advanced Cladding Material for PWR Application: AXIOM™", Pan et al., *Proceedings of* 2010 *LWR Fuel Performance/Top Fuel/WRFPM*, Orlando, Fla. 09/26-29/2010 ("technical paper").

Mardon et al. taught zirconium alloy tubes for forming the whole or outer portion of a nuclear fuel cladding or assembly guide tube having a low tin composition: 0.8-1.8 wt. % Nb; 0.2-0.6 wt. % Sn, 0.02-0.4 wt. % Fe, with a carbon content of 30-180 ppm, a silicon content of 10-120 ppm and an oxygen content of 600-1800 ppm, with the rest Zr. Jeong et al. taught a niobium containing zirconium alloy for high burn-up nuclear fuel application containing Nb, Sn, Fe, Cr, Zr with possible addition of Cu. The Pan et al. "technical paper" lists Alloys listed as X1, X4, X5, X5A, but deliberately only very generally describes the actual composition weight percentages, being very vague in this regard. Pan et al. reports tensile strength, elongation and creep test data, and shows micrographs and in-reactor corrosion and oxide thickness data.

Aqueous corrosion in zirconium alloys is a complex, multi-step process. Corrosion of the alloys in reactors is further complicated by the presence of an intense radiation field which may affect each step in the corrosion process. In the early stages of oxidation, a thin compact black oxide film develops that is protective and retards further oxidation. This dense layer of zirconia exhibits a tetragonal crystal structure which is normally stable at high pressure and temperature. As the oxidation proceeds, the compressive stresses in the oxide layer cannot be counterbalanced by the tensile stresses in the metallic substrate and the oxide undergoes a transition. Once this transition has occurred, only a portion of the oxide layer remains protective. The dense oxide layer is then renewed below the transformed oxide. A new dense oxide layer grows underneath the porous oxide. Corrosion in zirconium alloys is characterized by this repetitive process of growth and transition. Eventually, the process results in a relatively thick outer layer of non-protective, porous oxide. There have been a wide variety of studies on corrosion processes in zirconium alloys. These studies range from field measurements of oxide thickness on irradiated fuel rod cladding to detailed micro-characterization of oxides formed on zirconium alloys under well-controlled laboratory conditions. However, the in-reactor corrosion of zirconium alloys is an extremely complicated, multi-parameter process. No single theory has yet been able to completely define it.

Corrosion is accelerated in the presence of lithium hydroxide. As pressurized water reactor (PWR) coolant contains lithium, acceleration of corrosion due to concentration of lithium in the oxide layer must be avoided. Several disclosures in U.S. Pat. Nos. 5,112,573 and 5,230,758 (both Foster et al.) taught an improved ZIRLO composition that was more economically produced and provided a more easily controlled composition while maintaining corrosion resistance similar to previous ZIRLO compositions. It contained 0.5-2.0 wt. % Nb; 0.7-1.5 wt. % Sn; 0.07-0.14 wt. % Fe and 0.03-0.14 wt. % of at least one of Ni and Cr, with the rest Zr. This alloy had a 520° C. high temperature steam weight gain at 15 days of no more than 633 mg/dm². U.S. Pat. No. 4,938,920 to Garzarolli teaches a composition having 0-1 wt. % Nb; 0-0.8 wt. % Sn, and at least two metals selected from iron, chromium and vanadium. However, Garzarolli does not disclose an alloy that had both niobium and tin, only one or the other.

Sabol et al. in "In-Reactor Corrosion Performance of ZIRLO and Zircaloy-4," *Zirconium in the Nuclear Industry: Tenth International Symposium*, A. M. Garde and E. R. Bradley Eds., American Society for Testing and Materials, ASTM STP 1245, Philadelphia 1994, pp. 724-744, demonstrated that, in addition to improved corrosion performance, ZIRLO material also has greater dimensional stability (specifically, irradiation creep and irradiation growth) than Zircaloy-4. More recently, U.S. Pat. No. 5,560,790 (Nikulina et al.) taught zirconium-based materials having high tin contents where the microstructure contained Zr—Fe—Nb particles. The alloy composition contained: 0.5-1.5 wt. % Nb; 0.9-1.5 wt. % Sn; 0.3-0.6 wt. % Fe, with minor amounts of Cr, C, 0 and Si, with the rest Zr.

While these modified zirconium based compositions are claimed to provide improved corrosion resistance as well as improved fabrication properties, economics have driven the operation of nuclear power plants to higher coolant temperatures, higher burn-ups, higher concentrations of lithium in the coolant, longer cycles, and longer in-core residence times that have resulted in increased corrosion duty for the cladding. Continuation of this trend as burn-ups approach and exceed 70,000 MWd/MTU will require further improvement in the corrosion properties of zirconium based alloys. The alloys of this invention provide such corrosion resistance.

Another potential way to increase corrosion resistance is through the method of forming of the alloy itself. To form alloy elements into a tubing or strip, ingots are conventionally vacuum melted and beta quenched, and thereafter formed into an alloy through a gauntlet of reductions, intermediate anneals, and final anneals, wherein the intermediate anneal temperature is typically above 1105° F. for at least one of the intermediate anneals. In U.S. Pat. No. 4,649,023 to Sabol et al., the ingots are extruded into a tube after the beta quench, beta annealed, and thereafter alternatively cold worked in a pilger mill and intermediately annealed at least three times. While a broad range of intermediate anneal temperatures are disclosed, the first intermediate anneal temperature is preferably 1112° F., followed by a later intermediate anneal temperature of 1076° F. The beta annealing step preferably uses temperatures of about 1750° F. Foster et al., in U.S. Pat. No. 5,230,758, determined the formability and steam corrosion for intermediate anneal temperatures of 1100° F., 1250° F., and 1350° F. An increase in intermediate anneal temperature is associated with an increase in both formability and corrosion resistance. U.S. Pat. No. 5,887,045 to Mardon et al. discloses an alloy forming method having at least two intermediate annealing steps carried out between 1184° to 1400° F.

Note that the prior art for corrosion improvement summarized above involves alloying element additions and different intermediate anneal temperatures, but, notably, not the final anneal heat treatment temperature. Rudling et al., in, "Corrosion Performance of Zircaloy-2 and Zircaloy-4 PWR Fuel Cladding," *Zirconium in the Nuclear Industry: Eight International Symposium*, ASTM STP 1023, L. F. Van Swam and C. M. Eucken, eds. American Society for Testing and Materials, Philadelphia, 1989, pp. 213-226, reported that Zr-4 fuel rod cladding fabricated from the same ingot with final heat treatments of stress-relieved (SRA) and fully recrystallized (RXA) exhibited similar oxide thickness corrosion (see Table 1).

TABLE 1

Post irradiation oxide thickness of Zr-4 cladding after 1-cycle of irradiation.

| Final Heat Treatment | 4 Rod Average of the Maximum Oxide Thickness (μm) |
| --- | --- |
| SRA | 12 +/− 1 |
| RXA | 10 +/− 1 |

Foster et al., in U.S. Pat. No. 5,125,985, presents a straightforward method of controlling the creep by use of the final area reduction and intermediate anneal temperature. A decrease in final area reduction decreases creep, and an increase in intermediate anneal temperature decreases creep. In different applications, the in-reactor creep can be more important than in-reactor corrosion. One such example is fuel rods containing fuel pellets coated with $ZrB_2$. $ZrB_2$ is a neutron absorber. When neutrons are absorbed, He gas is released which increases the rod internal pressure. In this case, creep resistant cladding is necessary so that the fuel/cladding gap remains closed. A closed fuel/cladding gap ensures that the fuel temperatures do not increase due to the formation of a He gas gap between the fuel and cladding. The new technology presented below in the Summary of the Invention will show that either the cladding corrosion or the cladding in-reactor creep may be improved by the final heat treatment.

A further issue in nuclear reactors is corrosion of welds utilized in a nuclear fuel assembly. In a typical fuel rod, nuclear fuel pellets are placed within the cladding, which is enclosed by end caps on either end of the cladding, such that the end caps are welded to the cladding. The weld connecting the end caps to the cladding, however, generally exhibits corrosion to an even greater extent than the cladding itself, usually by a factor of two over non-welded metal. Rapid corrosion of the weld creates an even greater safety risk than the corrosion of non-welded material, and its protection has previously been ignored. In addition, grids have many welds and the structural integrity depends on adequate weld corrosion resistance.

Thus, there continually remains a vital need, even in this late stage of nuclear power development, for novel zirconium cladding alloys that exhibit improved corrosion resistance and improved in-reactor irradiation creep resistance over known alloys in the field, and improved welds for holding end caps on claddings and for joining grid straps that likewise exhibit increased corrosion resistance. And, as can be seen, these cladding art patents and papers provide an extremely compact art area, where only very minor changes have shown, after extended testing, major and dramatic improvements. Thus, minor improvements can easily establish patentability in this specific area.

Accordingly, an object of the present invention is to provide Zr—Nb alloys with improved corrosion resistance and/or improved in-reactor irradiation creep resistance through the selection of a specific type combination of final heat treatment.

New technology presented below in the Summary of the Invention, and elsewhere in the specification following, will show that the in-reactor corrosion is, in part, unexpectedly dependent on the specific type of final heat treatment.

SUMMARY OF THE INVENTION

The Zr—Nb alloys of this invention have improved alloy chemistry, improved weld corrosion resistance, and improved method of formation of alloys having reduced intermediate anneal temperatures during formation of the alloys.

The new technology showing the effect of an essential and critical final heat treatment (and the final microstructure) on the in-reactor corrosion of Zr—Nb—Sn—Fe type alloys is presented in FIGS. 1 and 2. FIG. 1 shows the in-reactor oxide thickness corrosion data for 0.77 weight % Sn ZIRLO irradiated for 1, 2 and 3 cycles in the Vogtle Unit 2 PWR. All of the cladding was fabricated from the same ingot and received identical processing except for the final heat treatment. The cladding was given 3 different final anneal heat treatments of stress relief annealed ("SRA"), partially recrystallized ("PRXA") and fully recrystallized ("RXA"). The amount of recrystallization in the PRXA heat treatment was about 15-20%.

A generic composition useful in this invention, to provide unexpected results in corrosion resistance and/or in-reactor irradiation creep resistance, is an alloy comprising:

0.2 to 1.5 weight percent niobium,
0.01 to 0.6 weight percent iron,
and additional alloying elements selected from the group consisting of:
0.0 to 0.8 weight percent tin
0.0 to 0.5 weight percent chromium
0.0 to 0.3 weight percent copper
0.0 to 0.3 weight percent vanadium
0.0 to 0.1 weight percent nickel, with the balance at least 97 weight percent zirconium, including impurities, wherein said alloy is characterized in that it has improved corrosion resistance properties due to a final heat treatment selected from one of i) SRA or PRXA (15-20% RXA) providing low corrosion; or ii) RXA or PRXA (80-95% RXA) providing low creep rate. Impurities mean less than 60 ppm or 0.006 wt. %.

Other more specific compositions are set forth in the specification and claims.

DESCRIPTION OF THE PREFERRED EMBODIMENTS

Figure 1:
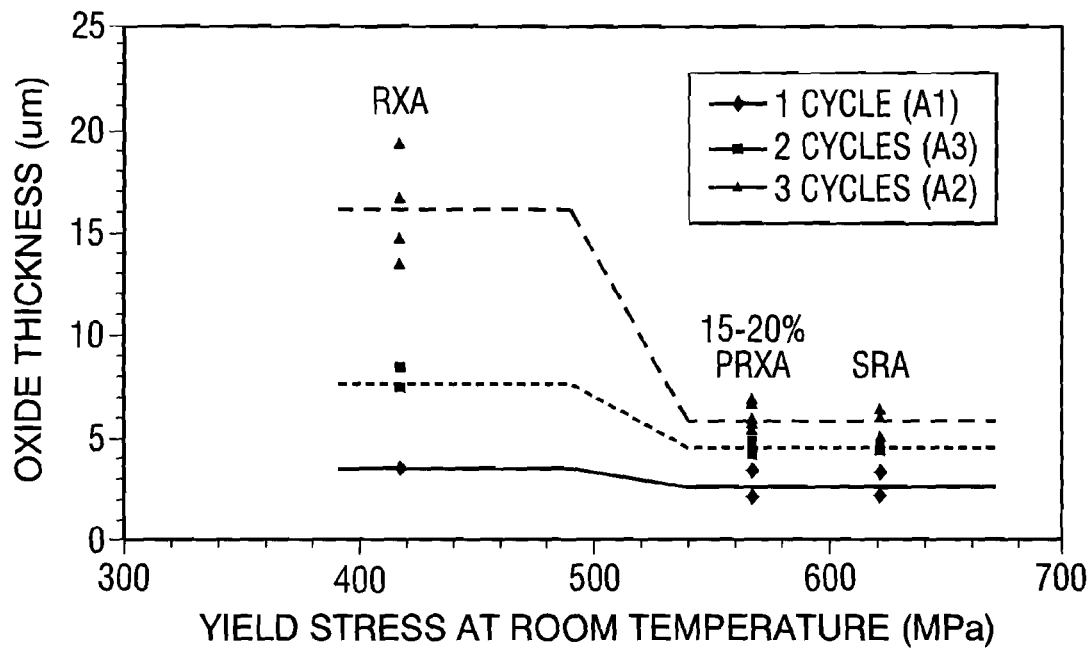
FIG. 1, which, in part, best illustrates the invention, is a graph depicting the oxide thickness due to corrosion versus the room temperature yield stress and associated final alloy microstructure of 0.77 Low-Sn ZIRLO.

Referring now to the drawings; FIG. 1 very importantly shows that the oxide thickness depends on the final heat treatment. FIG. 1 presents the corrosion of 0.77 Sn ZIRLO. All of the cladding was fabricated from the same ingot and received identical processing except for the final heat treatment. The cladding was given three final heat treatments of SRA, PRXA and RXA. The highest corrosion (highest oxide thickness) was exhibited by cladding with the RXA —fully recrystallized—final heat treatment. Significantly lower corrosion was exhibited by cladding with both SRA and PRXA (15% to 20%) final heat treatments.

Figure 2:
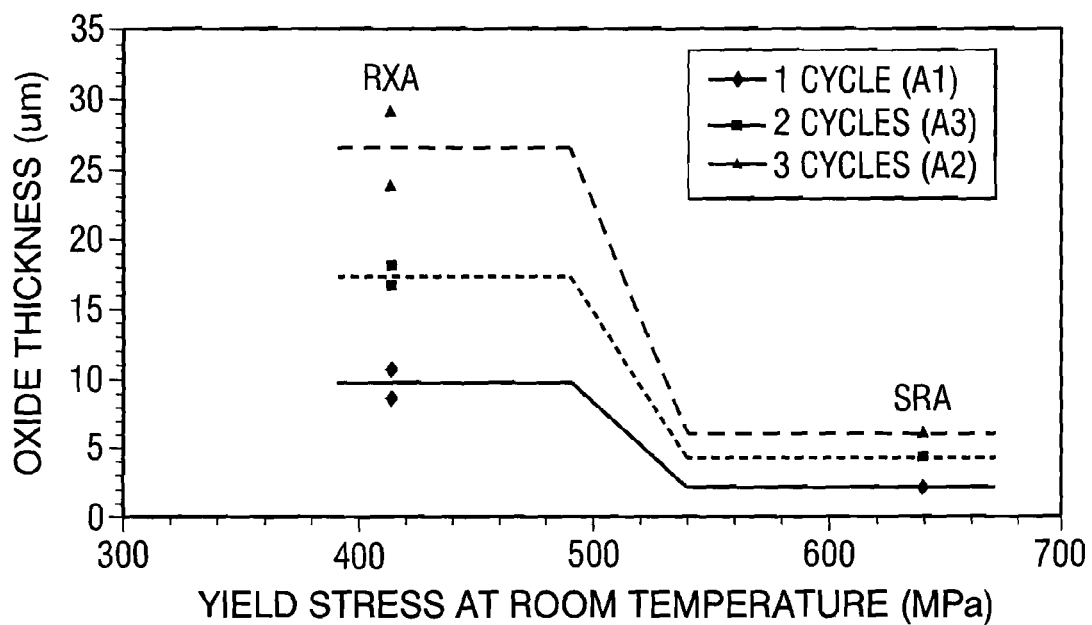
FIG. 2, which, in part, best illustrates the invention, is a graph depicting the oxide thickness due to corrosion versus the room temperature yield stress and the associated final alloy microstructure of Standard ZIRLO.

FIG. 2 very importantly shows the in-reactor oxide thickness corrosion data for Standard ZIRLO (1.02 weight % Sn) irradiated for 1, 2 and 3 cycles in the Vogtle Unit 2 PWR. All of the cladding was fabricated from the same ingot and received identical processing except for the final heat treatment. The cladding was given 2 different final anneal heat treatments of SRA and RXA. FIG. 2, very importantly, shows that the oxide thickness depends on the final heat treatment as exhibited by the 0.77 weight % Sn ZIRLO data in FIG. 1. The highest corrosion (highest oxide thickness) was exhibited by cladding with the RXA final heat treatment. Significantly lower corrosion was exhibited by cladding with the SRA final heat treatment.

Figure 3:
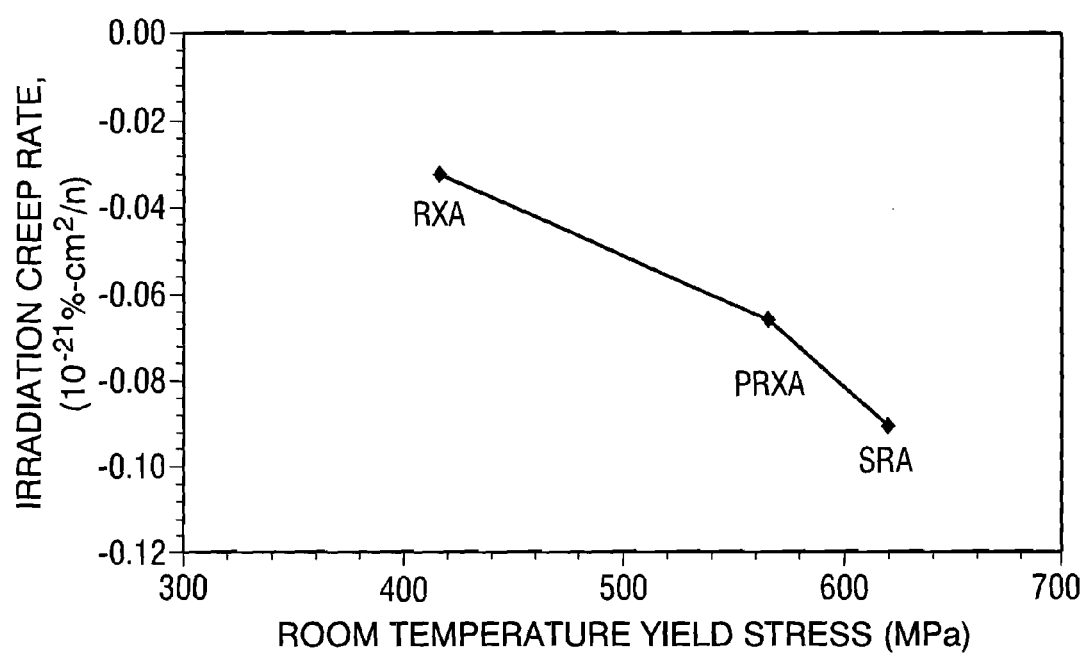
FIG. 3 is a graph depicting the in-reactor irradiation creep rate versus the room temperature as-fabricated yield stress and the associated final alloy microstructure of 0.77 Sn ZIRLO.

As discussed above, depending on the application, improved in-reactor creep resistance can be as important as improved corrosion resistance. The in-reactor creep is also dependent on the final heat treatment. FIG. 3, very importantly, presents the in-reactor steady state creep rate for 0.77 weight % Sn ZIRLO irradiated for 1, 2 and 3 cycles in the Vogtle Unit 2 PWR (see paragraph 13). FIG. 3 shows that the highest in-reactor creep resistance (that is, the lowest in-reactor creep rate) is exhibited by cladding with a RXA final heat treatment. The lowest in-reactor creep resistance (that is, the highest in-reactor creep rate) is exhibited by cladding with a SRA final heat treatment. Intermediate in-reactor creep resistance is exhibited by the PRXA final heat treatment. Thus, both SRA and PRXA are effective in this regard with RXA the best.

Hence, the effect of final heat treatment on in-reactor creep is opposite that of in-reactor corrosion. As a result, the cladding may be optimized for either maximum improved in-reactor corrosion resistance with a SRA or PRXA (15-20% RXA) final heat treatment, or maximum improved in-reactor creep resistance with a final PRXA (80-95% RXA) or RXA heat treatment.

In more substantial detail, each of these "terms," RXA, PRXA, SRA, etc. is defined as:

SRA means—heat treatment where the microstructure is stress-relief annealed.

RXA means—heat treatment where the microstructure is fully recrystallized.

PRXA (15-20% RXA) means—heat treatment where 15-20% of the microstructure is recrystallized and 80-85% of the microstructure is stress relief annealed.

PRXA (80-95% RXA) means—heat treatment where 80-95% of the microstructure is recrystallized and 5-20% of the microstructure is stress relief annealed.

Figure 4:
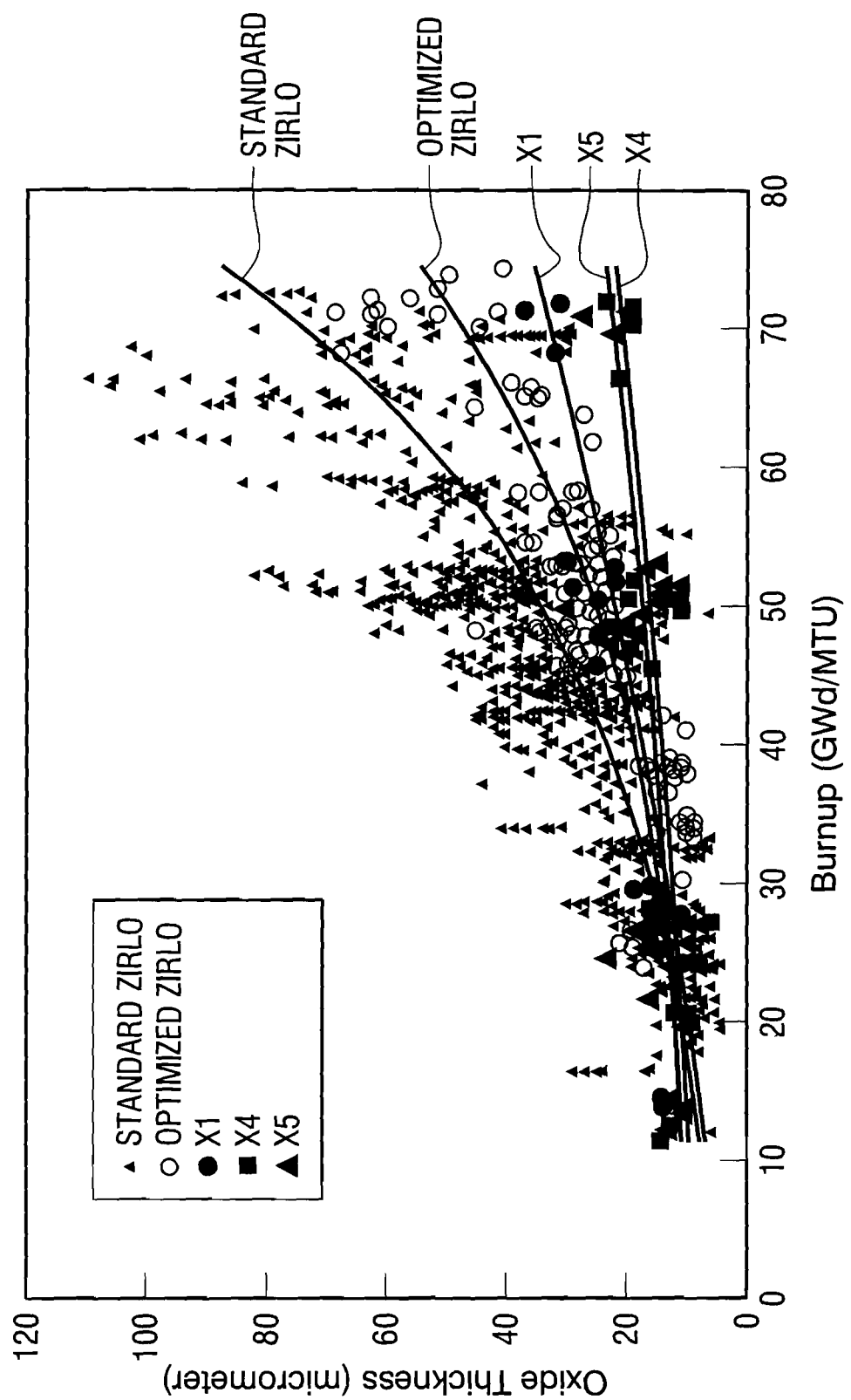
FIG. 4, which, in part, best illustrates the invention, is a graph depicting oxide thickness due to corrosion as a function of the burn-up for Standard ZIRLO, Optimized ZIRLO and Alloys X1, X4 and X5.

Note that the above SRA, PRXA and RXA designations represent more detailed descriptions of the final heat treatment process methods. It should be clear that this art area is not an area in patent filing where broad conclusions are suggestive of improved alloys within broad ranges; where, for example, 0.4 to 1.5 weight percent niobium and 0.1 to 0.8 weight percent tin, should be considered taught or obvious in view of a teaching of 0.0 to 3.0 weight percent niobium and 0.1 to 3.5 weight percent tin. As shown in FIG. 4, standard Zirlo compared to compositions X4 and X5 shows the dramatic difference a few tenths of weight percent elements make in this area:

Standard Zirlo: 0.5-2 wt % Nb; 0.9-1.5 wt. % Sn
X4: 1 wt. % Nb; 0 wt. % Sn, etc. or
X5: 0.7 wt. % Nb; 0.3 wt. % Sn, etc.;

where these seemingly reduced and very important minor changes in component elements provide extraordinarily improved oxide thickness. Specifically, at a burnup of 70

GWd/MTU, the oxide thickness is reduced at least by a factor of 3.5.

FIG. 4, very dramatically, illustrates at 75 GWd/MTU a range of oxide thickness of about 35-40 micrometer for alloy X1, and a range of about 16 to 26 micrometers for alloys X4 and X5, all showing critical improvements relative to standard ZIRLO.

A further object of the present invention is to provide a zirconium based alloy for use in an elevated temperature environment of a nuclear reactor, the alloy having 0.2 to 1.5 weight percent niobium, 0.01 to 0.6 weight percent iron, and additional alloy elements selected from 0.0 to 0.8 weight percent tin, 0.0 to 0.5 weight percent chromium, 0.0 to 0.3 weight percent copper, 0.0 to 0.3 weight percent vanadium, 0.0 to 0.1 weight percent nickel, the remainder at least 97 weight percent zirconium, including impurities. Further descriptions of vastly improved alloys X1, X4 and X5 follow.

Alloy X4: A further object of the present invention is to provide a zirconium based alloy (denoted as Alloy X4) for use in an elevated temperature environment of a nuclear reactor, the alloy having 0.6 to 1.5 weight percent niobium, 0.02 to 0.3 weight percent Cu, 0.01 to 0.1 weight percent iron, 0.15 to 0.35 weight percent chromium, the balance at least 97 weight percent zirconium, including impurities.

Alloy X5: A further object of the present invention is to provide a zirconium based alloy (denoted as Alloy X5), the alloy having 0.2 to 1.5 weight percent niobium, 0.25 to 0.45 weight percent iron, 0.05 to 0.4 weight percent tin, 0.15 to 0.35 weight percent chromium, 0.01 to 0.1 weight percent nickel, the balance at least 97 weight percent zirconium, including impurities.

Alloy X1: A further object of the invention is to provide a zirconium based alloy (denoted as Alloy X1), the alloy having 0.4 to 1.5 weight percent niobium, 0.05 to 0.4 weight percent tin, 0.01 to 0.1 weight percent iron, 0.02 to 0.3 weight percent copper, 0.12 to 0.3 weight percent vanadium, 0.0 to 0.5 weight percent chromium, the balance at least 97 weight percent zirconium, including impurities.

Alloy X6: A further specific object of the invention is to provide a zirconium based alloy (denoted as Alloy X6 and referred to as "Optimized" ZIRLO), shown in FIG. 4, the alloy having 0.4 to 1.5 weight percent niobium, 0.1 to 0.8 weight percent tin, 0.01 to 0.6 weight percent iron, 0.0 to 0.5 weight percent chromium, the balance at least 97 weight percent zirconium, including impurities. This alloy is still vastly superior to standard ZIRLO.

The final heat treatment of Alloy X1 is PRXA (~80% RXA), which is associated with maximum, improved (low) in-reactor creep resistance. In addition, note that the corrosion resistance of Alloy X1 is significantly increased relative to Standard ZIRLO, by a factor of 2.2 at a burn-up of 70 GWd/MTU (see FIG. 4), because of decreased Sn and the addition of Cu. Further, if the amount of RXA in the PRXA final heat treatment of Alloy X1 is decreased to about 15-20%, the corrosion resistance of Alloy X1 would be further improved.

The final heat treatment of Alloy X4 is PRXA (~80% RXA) which is associated with maximum improved in-reactor creep resistance. At a burn-up of 70 GWd/MTU, the corrosion resistance of Alloy X4 is increased be a factor of about 3.5 (see FIG. 4) relative to Standard ZIRLO. Note that the corrosion resistance of Alloy X4 is significantly increased relative to Standard ZIRLO because of decreased Sn and the additions of Cu and Cr. In addition, if the amount of RXA in the PRXA final heat treatment of Alloy X4 is decreased to about 15-20% PRXA (15-20% RXA), the corrosion resistance of Alloy X4 would by further improved.

The final heat treatment of Alloy X5 is PRXA (~50% RXA), which is considered to be intermediate between maximum improved in-reactor creep resistance and maximum improved in-reactor corrosion resistance. FIG. 4 shows that at a burn-up of 70 GWd/MTU, the corrosion resistance of Alloy X5 is increased be a factor of about 3.0 relative to Standard ZIRLO. Note that the corrosion resistance of Alloy X5 is significantly increased relative to Standard ZIRLO because of decreased Sn, increased Fe and the addition of Cr.

Figure 5A:
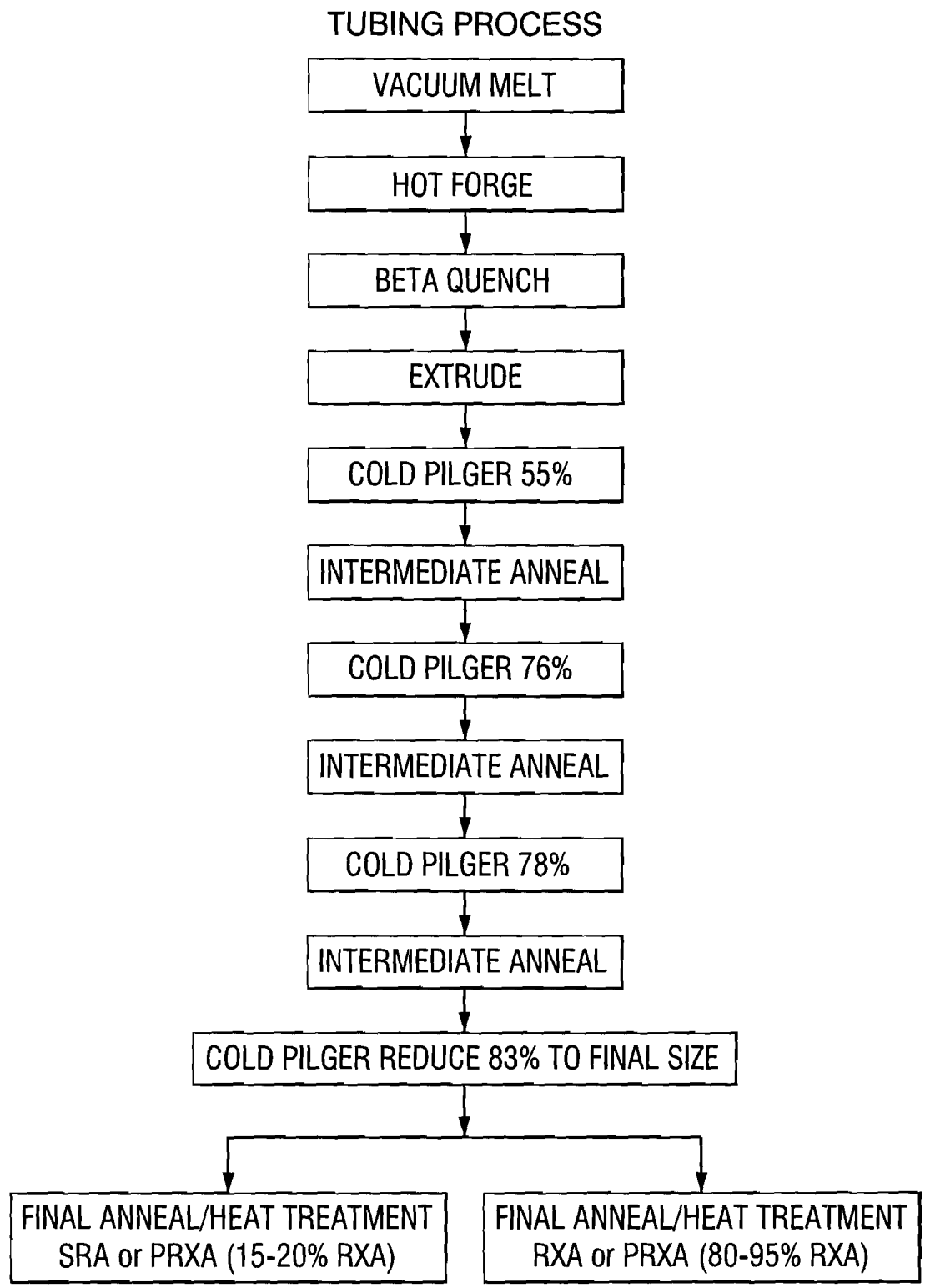
FIG. 5A is a process flow diagram of a method for forming zirconium alloy tubing.
Figure 5B:
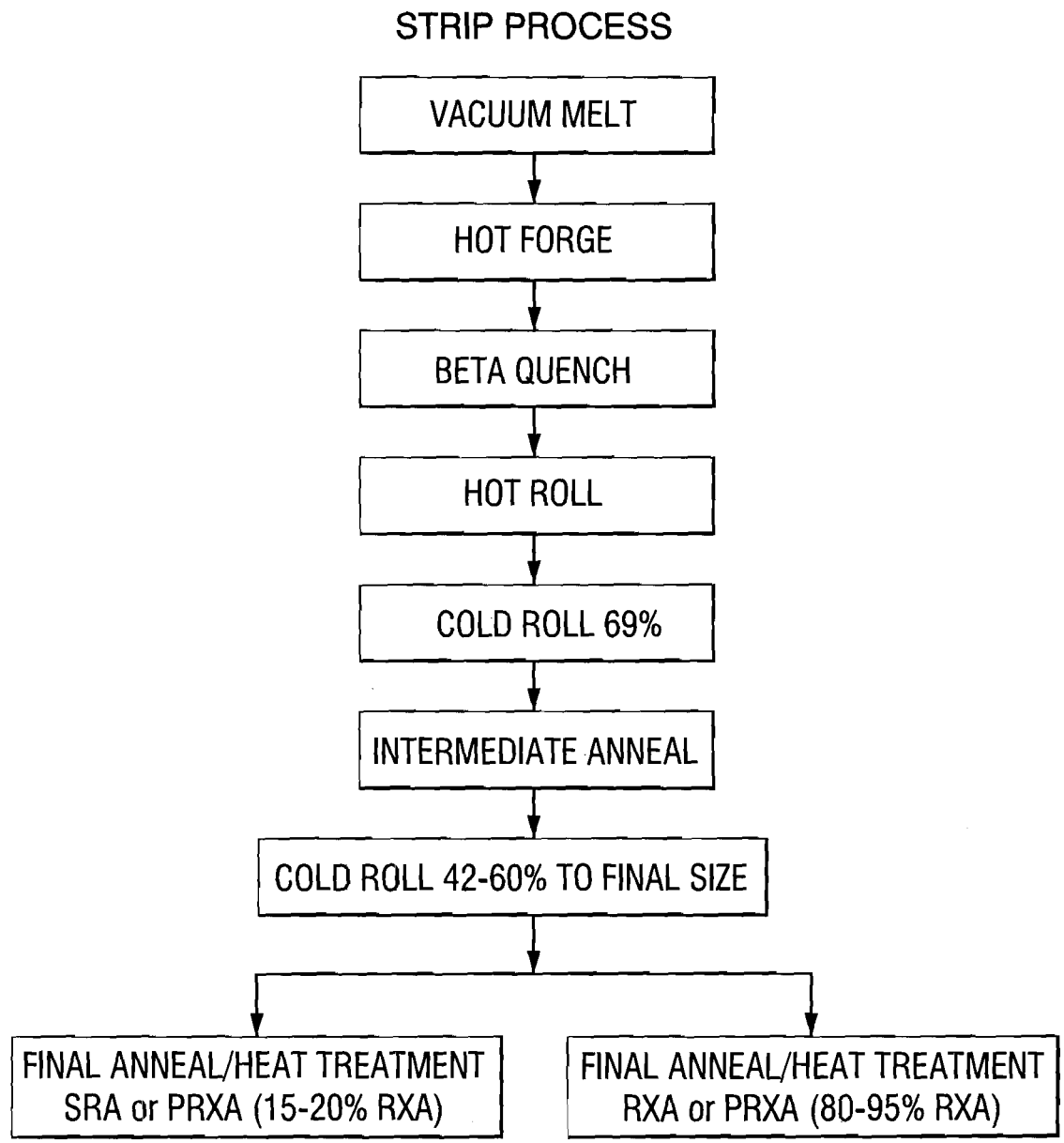
FIG. 5B is a process flow diagram of a method for forming zirconium alloy strips.
Figure 6:
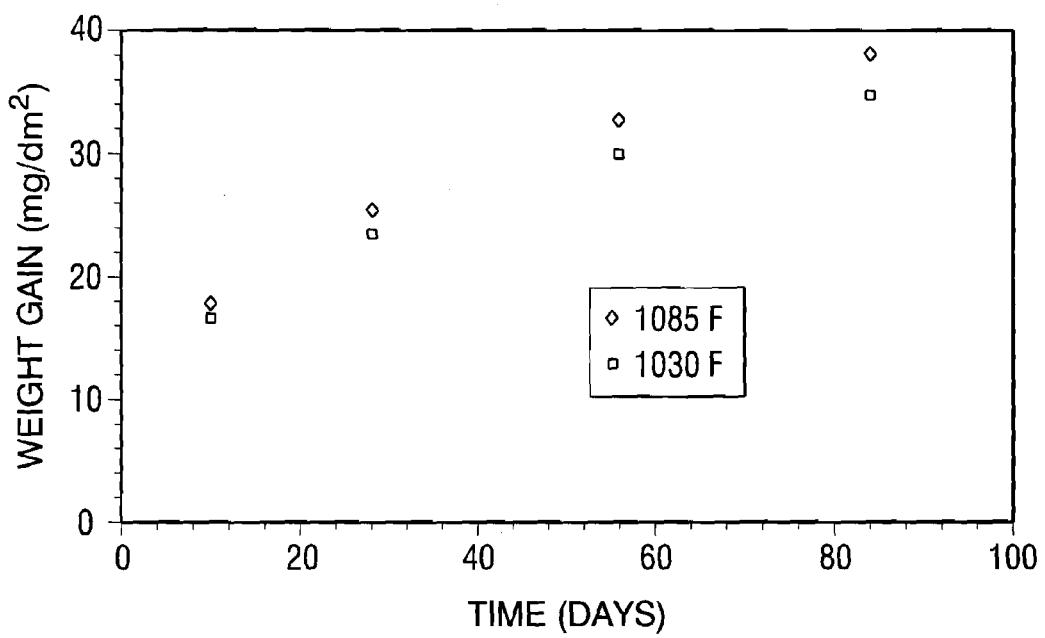
FIG. 6 is a graph depicting the 680° F. water test weight gain of Standard ZIRLO as a function of autoclave exposure time for material processed with intermediate anneal temperatures of 1085° and 1030° F.
Figure 7:
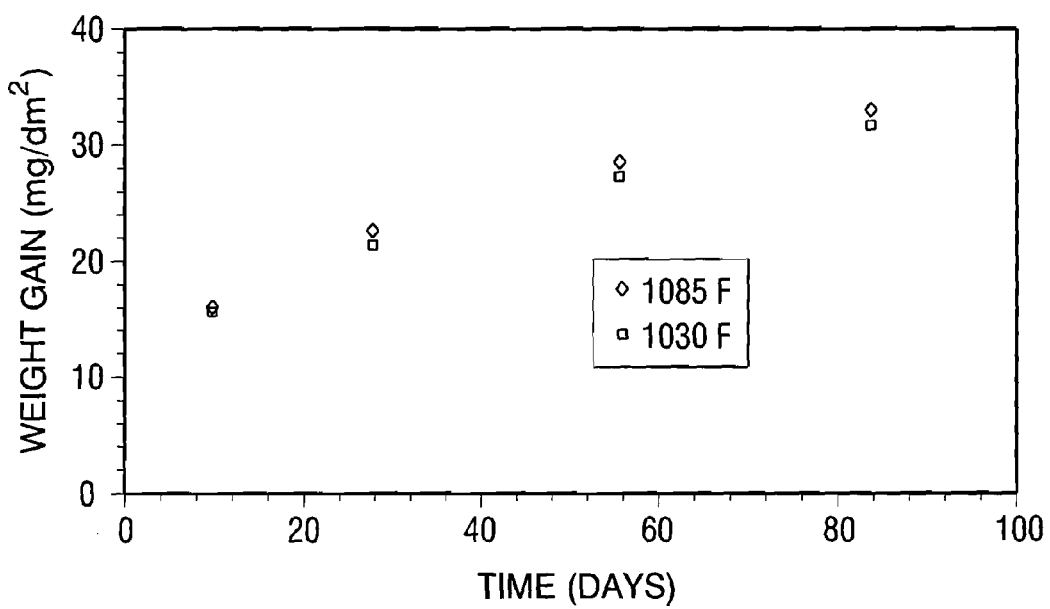
FIG. 7 is a graph depicting the 680° F. water test weight gain of Alloy X1 as a function of autoclave exposure time for material processed with intermediate anneal temperatures of 1085° and 1030° F.
Figure 8:
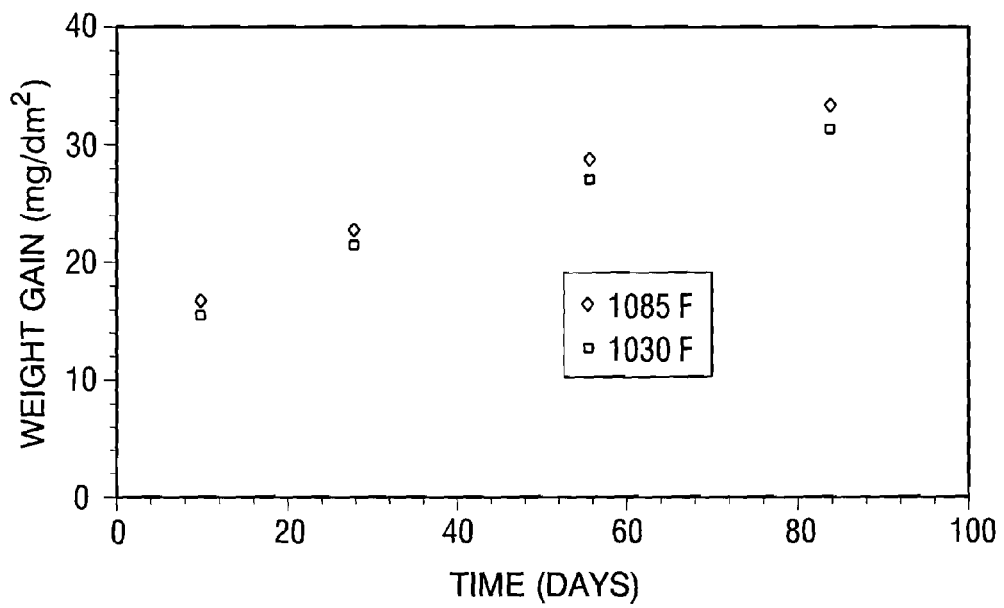
FIG. 8 is a graph depicting the 680° F. water test weight gain of Alloy X4 as a function of autoclave exposure time for material processed with intermediate anneal temperatures of 1085° and 1030° F.
Figure 9:
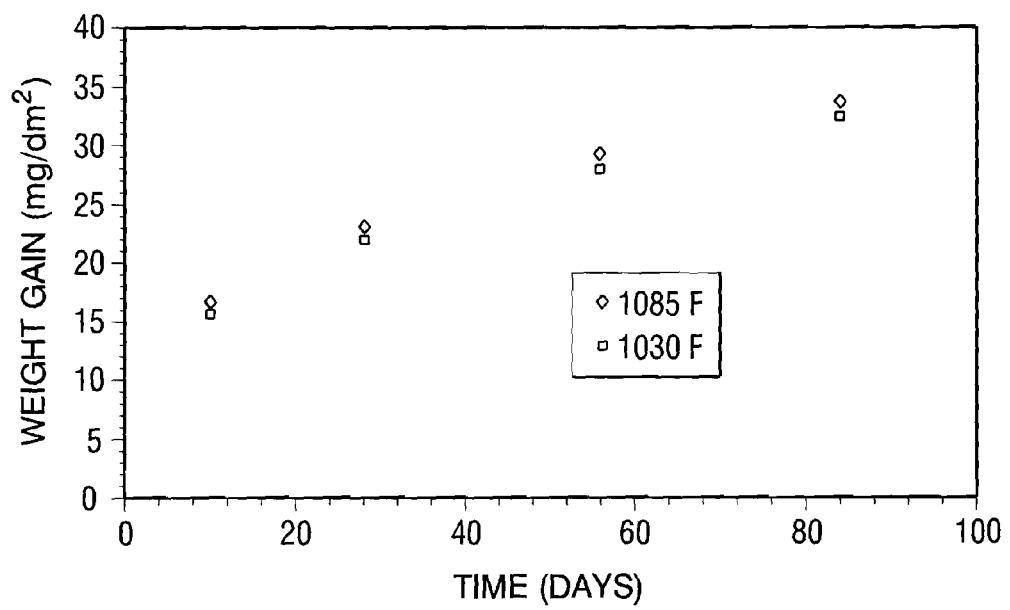
FIG. 9 is a graph depicting the 680° F. water test weight gain of Alloy X5 as a function of autoclave exposure time for material processed with intermediate anneal temperatures of 1085° and 1030° F.
Figure 10:
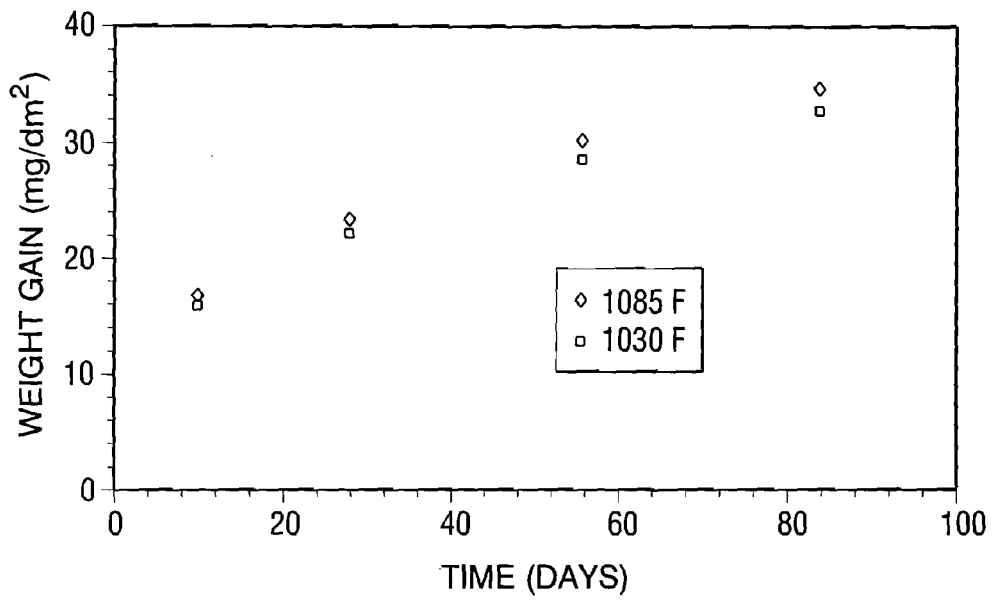
FIG. 10 is a graph depicting the 680° F. water test weight gain of Alloy X6 as a function of autoclave exposure time for material processed with intermediate anneal temperatures of 1085° and 1030° F.
Figure 11:
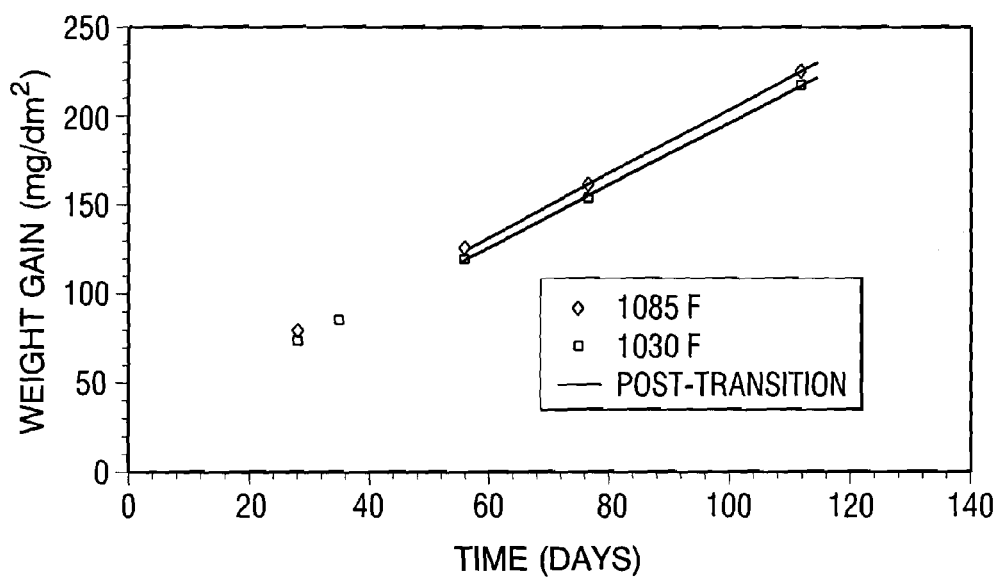
FIG. 11 is a graph depicting the 800° F. steam test weight gain of Standard ZIRLO as a function of autoclave exposure time for material processed with intermediate anneal temperatures of 1085° and 1030° F.
Figure 12:
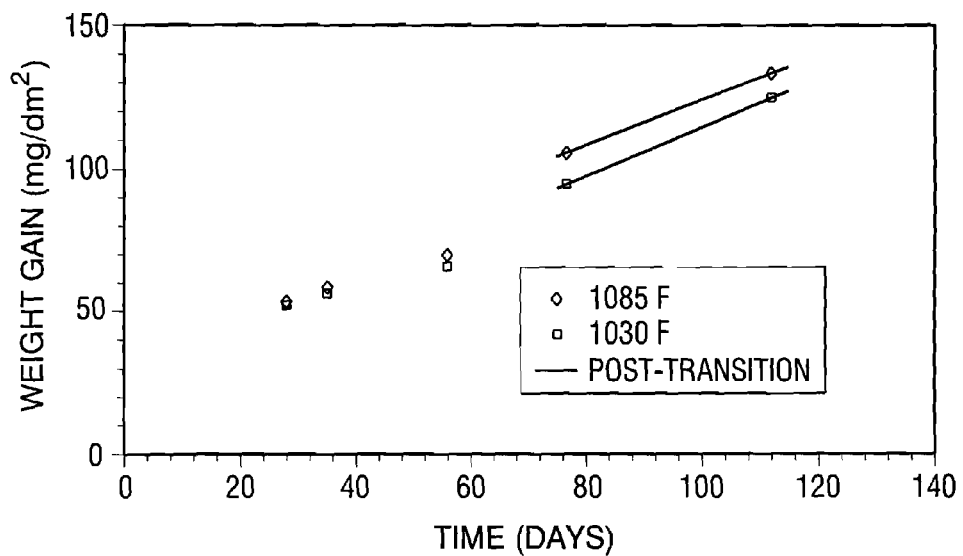
FIG. 12 is a graph depicting the 800° F. steam test weight gain of Alloy X1 as a function of autoclave exposure time for material processed with intermediate anneal temperatures of 1085° and 1030° F.
Figure 13:
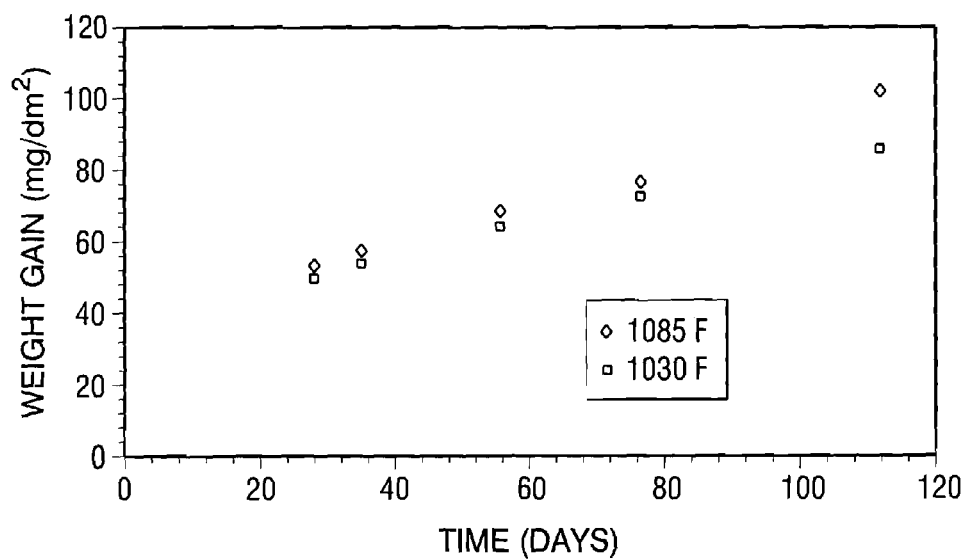
FIG. 13 is a graph depicting the 800° F. steam test weight gain of Alloy X4 as a function of autoclave exposure time for material processed with intermediate anneal temperatures of 1085° and 1030° F.
Figure 14:
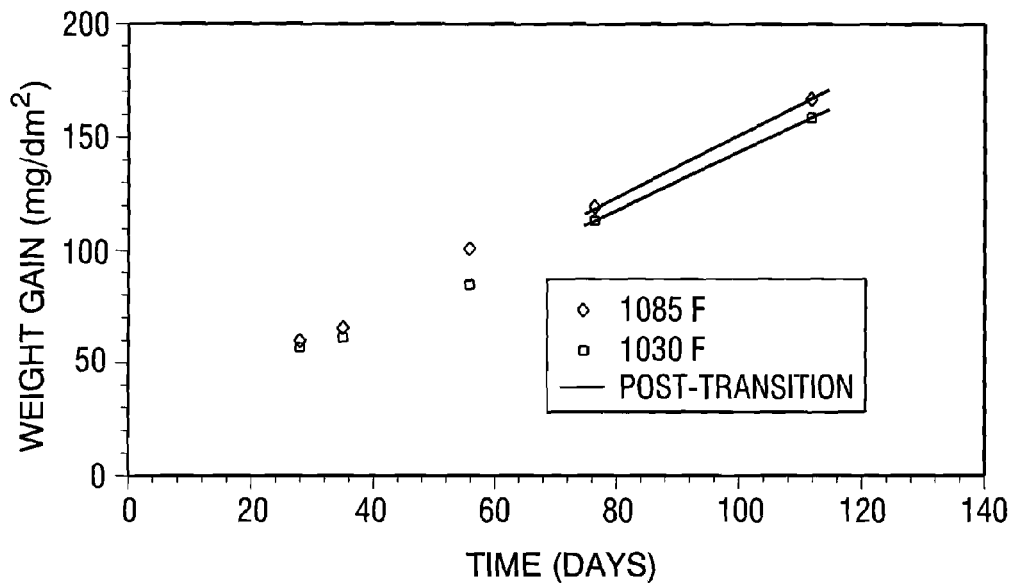
FIG. 14 is a graph depicting the 800° F. steam test weight gain of Alloy X5 as a function of autoclave exposure time for material processed with intermediate anneal temperatures of 1085° and 1030° F.
Figure 15:
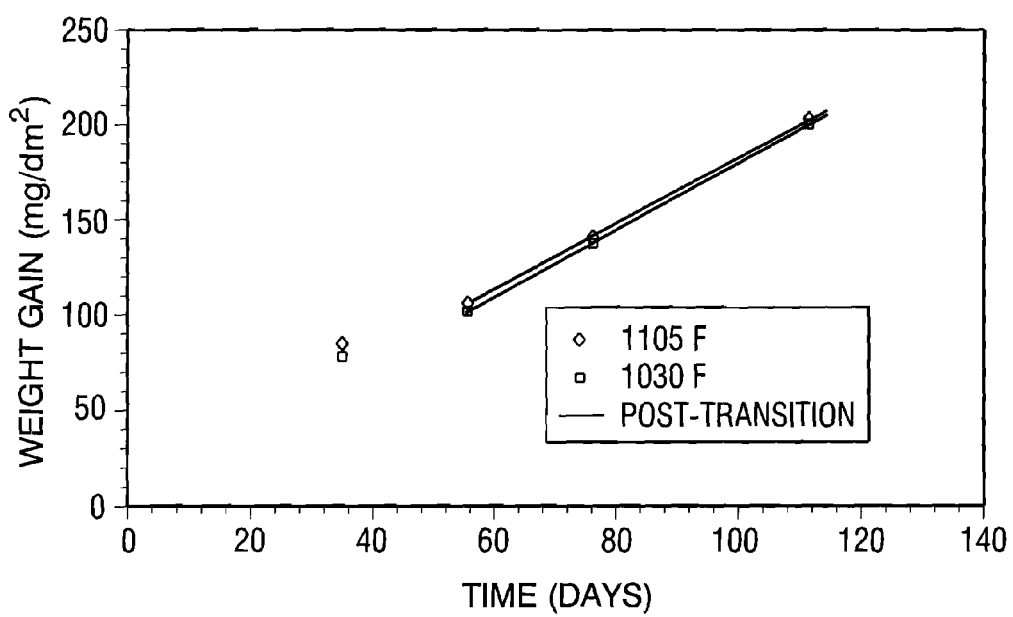
FIG. 15 is a graph depicting the 800° F. steam test weight gain of Alloy X6 as a function of autoclave exposure time for material processed with intermediate anneal temperatures of 1085° and 1030° F.

A sequence of steps for forming a cladding, strip, tube or like object known in the art from an alloy of the present invention is shown in FIGS. 5A and 5B. To create tubing for cladding, as shown in FIG. 5A, compositional zirconium based alloys were fabricated from vacuum melted ingots or other like material known in the art. The ingots were preferably vacuum arc-melted from sponge zirconium with a specified amount of alloying elements. The ingots were then forged into a material and thereafter β-quenched. β-quenching is typically done by heating the material (also known as a billet) up to its β-temperature, between around 1273 to 1343K. The quenching generally consists of quickly cooling the material by water. The β-quench is followed by extrusion. Thereafter, the processing includes cold working the tube-shell by a plurality of cold reduction steps, alternating with a series of intermediate anneals at a set temperature. The cold reduction steps are preferably done on a pilger mill. The intermediate anneals are conducted at a temperature in the range of 960-1125° F. The material may be optionally re-β-quenched prior to the final and foamed into an article there-from. The final heat treatment discussed previously is also shown.

For tubing, a more preferred sequence of events after extrusion includes initially cold reducing the material in a pilger mill, an intermediate anneal with a temperature of about 1030 to 1125° F., a second cold reducing step, a second intermediate anneal within a temperature range of about 1030° to 1070° F., a third cold reducing step, and a third intermediate anneal within a temperature range of about 1030° to 1070° F. The reducing step prior to the first intermediate anneal is a tube reduced extrusion (TREX), preferably reducing the tubing about 55%. Subsequent reductions preferably reduce the tube about 70-80%.

Each reduction pass on the pilger mill is preferred to reduce the material being formed by at least 51%. The material then preferably goes through a final cold reduction. The material is then processed with a final anneal at temperatures from about 800-1300° F.

To create strip, compositional zirconium based alloys were fabricated from vacuum melted ingots or other like material known in the art. The ingots were preferably arc-melted from sponge zirconium with a specified amount of alloying elements. The ingots were then forged into a material of rectangular cross-section and thereafter β-quenched. Thereafter, the processing as shown in FIG. 5B, includes a hot rolling step after the beta quench, cold working by one or a plurality of cold rolling and intermediate anneal steps, wherein the intermediate anneal temperature is conducted at a temperature from about 960-1105° F. The material then preferably goes through a final pass and anneal, wherein the final anneal temperature is in the range of about 800-1300° F. The final heat treatment discussed previously is also shown.

A more preferred sequence to create the alloy strip includes an intermediate anneal temperature within a range of about 1030 to 1070° F. Further, the pass on the mill preferably reduces the material being formed by at least 40%.

The corrosion resistance was found to improve with intermediate anneals also that were consistently in the range of 960-1105° F., most preferably around 1030-1070° F., as opposed to typical prior anneal temperatures that are above the 1105° F. for at least one of the temperature anneals. As shown in FIGS. 6-10, a series of preferred alloy embodiments of the present invention were tested for corrosion in a 680° F. water autoclave and measured for weight gain. Tubing material was fabricated from the preferred embodiments of alloys of the present invention, referenced as Alloys X1, X4, X5 and X6, and placed in the 680° F. water autoclave. Data were available for a period of 100 days. Corrosion resistance measured in 680° F. water autoclaves for long term exposure have previously been found to correlate to corrosion resistance data of like alloys placed in-reactor. The preferred composition of these embodiments, further discussed below, are shown in Table 2. The preferred ranges of the compositions are presented in Table 3.

TABLE 2

| Alloy | Preferred Composition, by weight percentage |
|---|---|
| X1 | Zr—0.7Nb—0.3Sn—0.12Cu—0.18V—0.05Fe |
| X1 | Zr—1.0Nb—0.3Sn—0.12Cu—0.18V—0.05Fe |
| X1 + Cr | Zr—0.7Nb—0.3Sn—0.12Cu—0.18V—0.05Fe—0.2Cr |
| X1 + Cr | Zr—1.0Nb—0.3Sn—0.12Cu—0.18V—0.05Fe—0.2Cr |
| X4 | Zr—1.0Nb—0.05Fe—0.25Cr—0.08Cu |
| X5 | Zr—0.7Nb—0.3Sn—0.3Fe—0.25Cr—0.05Ni |
| X6 | Zr—1.0Nb—0.65Sn—0.1Fe |
| X6 + Cr | Zr—1.0Nb—0.65Sn—0.1Fe—0.2Cr |

TABLE 3

| Alloy | Preferred Composition Ranges, by weight percentage |
|---|---|
| X1 | Zr; 0.4-1.5Nb; 0.05-0.4Sn; 0.01-0.1Fe; 0.02-0.3Cu; 0.12-0.3V |
| X1 – Cr | Zr; 0.4-1.5Nb; 0.05-0.4Sn; 0.01-0.1Fe; 0.02-0.3Cu; 0.12-0.3V; 0.05-0.5Cr |
| X4 | Zr; 0.6-1.5Nb; 0.01-0.1Fe; 0.02-0.3Cu; 0.15-0.35Cr |
| X5 | Zr; 0.2-1.5Nb; 0.05-0.4Sn; 0.25-0.45Fe; 0.15-0.35Cr; 0.01-0.1Ni |
| X6 | Zr; 0.4-1.5Nb; 0.14-0.8Sn; 0.01-0.6Fe |
| X6 + Cr | Zr; 0.4-1.5Nb; 0.1-0.8Sn; 0.01-0.6Fe; 0.05-0.5Cr |

In order to evaluate the effect of intermediate anneal temperature on corrosion/oxidation, tubing of Standard ZIRLO and Alloys X1, X4 and X5 were processed with intermediate anneal temperatures of 1030° and 1085° F. The alloys of the invention were tested for corrosion resistance by measuring the weight gain over a period of time, wherein the weight gain is mainly attributable to an increase of oxygen (the hydrogen pickup contribution to the weight gain is relatively small and may be neglected) that occurs during the corrosion process. In general, corrosion related weight gain starts quickly and then the rate decreases with increasing time. This initial corrosion/oxidation process is termed as pre-transition corrosion. After a period of time, the corrosion rate increases, approximately linearly with time. This corrosion/oxidation phase is termed post-transition or rapid corrosion. As would be expected, alloys with greater corrosion resistance have lower corrosion rates in the pre- and post-transition phases.

FIGS. 6-10 present 680° F. water corrosion test data. As can be seen in FIGS. 6-10, the weight gain associated with tubing processed with 1030° F. intermediate anneal temperatures was less than for higher intermediate anneal temperatures. Further, the weight gains for Alloys X1, X4, X5 and X6 in FIGS. 7-10 were less than that of Standard ZIRLO in FIG. 6. Thus, as the modified alloy compositions and the lower intermediate anneal temperatures exhibit reduced weight gain, and reduced weight gain is correlated with increased corrosion resistance, increased corrosion resistance is directly correlated with the modified alloy compositions and the lower intermediate anneal temperature of the invention. The chemistry formulation of the alloys is correlated with increased corrosion resistance. All of the weight gains from the 680° F. water autoclave testing presented in FIGS. 6-10 are in the pre-transition phase. Although the improvement in the 680° F. water autoclave corrosion weight gain due to lowering of the intermediate anneal temperature appears to be small in view of FIGS. 6-10, the improvement of in-reactor corrosion resistance is expected to be higher than shown by the 680° F. water autoclave data because of in-reactor precipitation of second phase particles in these Zr—Nb alloys and a thermal feedback from a lower oxide conductivity due to lower oxide thickness. Such second phase particle precipitation only occurs in-reactor and not in autoclave testing.

In order to evaluate the effect of intermediate anneal temperature in post-transition corrosion, an 800° F. steam autoclave test was performed, as shown in FIGS. 11-15. The test was performed for sufficient time to achieve post-transition corrosion. Post transition corrosion rates generally began after a weight gain of about 80 mg/dm². Alloys X1, X4, X5 and Standard ZIRLO were processed using intermediate anneal temperatures of 1030° and 1085° F. Alloy X6 (Optimized Zirlo) tubing was processed using intermediate anneal temperatures of 1030° and 1105° F. The tubing was placed in an 800° F. steam autoclave for a period of about 110 days. FIGS. 11-15 show that the post-transition weight gains of the alloys processed at the intermediate anneal temperature of 1030° F. are less than for alloy materials processed at the higher temperatures of 1085° or 1105° F. Further, the weight gain for Alloys X1, X4, X5 and X6 (Optimized Zirlo) of FIGS. 12-15 are less than those of the prior disclosed Standard ZIRLO presented in FIG. 11. Thus, the low intermediate anneal temperatures provide substantial improvements over the prior art as it provides a significant advantage in safety, by protecting cladding or the grids from corrosion, in cost, as replacement of the fuel assemblies can be done less often, and through efficiency, as the less corroded cladding better transmits the energy of the fuel rod to the coolant.

Figure 16:
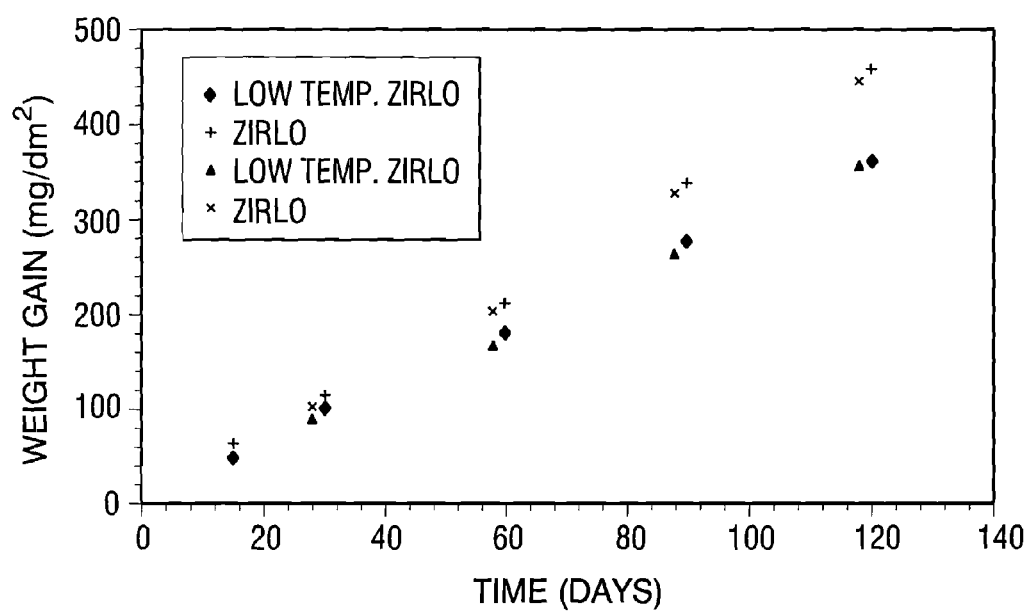
FIG. 16 is a graph comparing the 800° F. steam weight gain for Standard ZIRLO strip processed with low temperature intermediate and final anneal temperatures.

Standard ZIRLO strip was processed with intermediate anneal temperatures of 968° and 1112° F. The material was tested for corrosion resistance by measuring the weight gain over a period of time, wherein the weight gain is mainly attributable to an increase of oxygen (the hydrogen pickup contribution to the weight gain is relatively small and may be neglected) that occurs during the corrosion process. The low temperature strip was processed with an intermediate anneal temperature of 968° F. and a final anneal temperature of 1112° F. The standard strip was processed with an intermediate anneal temperature of 1112° F. and a final anneal temperature of 1157° F. FIG. 16 shows that the low temperature processed material exhibits significantly lower corrosion/oxidation than the higher temperature processed material.

The zirconium alloys of the present invention provide improved corrosion resistance through the chemistry of new alloy combinations. The alloys are generally formed into cladding (to enclose fuel pellets) and strip (for spacing fuel rods) for use in a water based nuclear reactor. The alloys generally include 0.2 to 1.5 weight percent niobium, 0.01 to 0.6 weight percent iron, and additional alloying elements selected from the group consisting of 0.0 to 0.8 weight percent tin, 0.0 to 0.5 weight percent chromium, 0.0 to 0.3 weight percent copper, 0.0 to 0.3 weight percent vanadium and 0.01 to 0.1 weight percent nickel. The balances of the alloys are at least 97 weight percent zirconium, including impurities. Impurities may include about 900 to 1500 ppm of oxygen.

A first embodiment of the present invention is a zirconium alloy having, by weight percent, about 0.4-1.5% Nb; 0.05-0.4% Sn, 0.01-0.1% Fe, 0.02-0.3% Cu, 0.12-0.3% V, 0.0-0.5% Cr and at least 97% Zr including impurities, hereinafter designated as Alloy X1. This embodiment, and all subsequent embodiments, should have no more than 0.50 wt. % additional other component elements, preferably no more than 0.30 wt. % additional other component elements, such as nickel, chromium, carbon, silicon, oxygen and the like, and with the remainder Zr. Chromium is an optional addition to Alloy X1. Wherein chromium is added to Alloy X1, the alloy is hereinafter designated as Alloy X1+Cr.

Alloy X1 was fabricated into tubing and its corrosion rate was compared to that of a series of alloys likewise fabricated into tubing, including ZIRLO-type alloys and Zr—Nb compositions. The results are shown in FIG. 4. FIG. 4 shows that the in-reactor corrosion resistance of Alloy X1 is increased by a factor of 2.2 relative to Standard ZIRLO. The chemistry formulations of Alloy X1 provide substantial improvement over the prior art as it relates to corrosion resistance in a nuclear reactor.

A second embodiment of the present invention is a zirconium alloy having, by weight percent, about, about 0.6-1.5% Nb; 0.01-0.1% Fe, 0.02-0.3% Cu, 0.15-0.35% Cr and at least 97% Zr, hereinafter designated as Alloy X4. FIG. 4 shows that the in-reactor corrosion resistance of Alloy X4 is increased by a factor of 3.5 relative to Standard ZIRLO. A preferred composition of Alloy X4 has weight percent ranges for the alloy with about 1.0% Nb, about 0.05% Fe, about 0.25% Cr, about 0.08% Cu, and at least 97% Zr.

The preferred Alloy X4 was fabricated into tubing and its corrosion rate was compared with the corrosion rate of Standard ZIRLO. The chemistry formulations of Alloy X4, like Alloy X1, provides substantial improvements over the prior art as it relates to corrosion resistance in a nuclear reactor.

A third embodiment of the present invention is a zirconium alloy having, by weight percent, about 0.2-1.5% Nb; 0.05-0.4% Sn, 0.25-0.45% Fe, 0.15-0.35% Cr, 0.01-0.1% Ni, and at least 97% Zr, hereinafter designated as Alloy X5. This composition should have no more than 0.5 wt. % additional other component elements, preferably no more than 0.3 wt. % additional other component elements, such as carbon, silicon, oxygen and the like, and with the remainder Zr.

A preferred composition of Alloy X5 has weight percent values for the alloy with about 0.7% Nb; about 0.3% Sn, about 0.35% Fe, about 0.25% Cr, about 0.05% Ni, and at least 97% Zr.

The preferred embodiment of Alloy X5 was fabricated into tubing and its corrosion rate was compared to that of a series of alloys likewise fabricated into tubing. FIG. 4 shows that the in-reactor corrosion resistance of Alloy X5 is increased by a factor of 3.0 relative to Standard ZIRLO.

The chemistry formulations of Alloy X5 provide substantial improvement over the prior art as it relates to corrosion resistance in a nuclear reactor.

Another embodiment of the invention is a low-tin ZIRLO alloy designated as Alloy X6 ("Optimized Zirlo"). FIG. 4 shows that the corrosion in-reactor resistance of Alloy X6 is increased by a factor of 1.5 relative to Standard ZIRLO. The reduction of tin increases the corrosion resistance. Tin, however, increases the in-reactor creep strength, and too small an amount of tin makes it difficult to maintain the desired creep strength of the alloy. Thus, the optimum tin of this alloy must balance these two factors. As a result, this embodiment is a low-tin alloy essentially containing, by weight percent, 0.4-1.5% Nb; 0.1-0.8% Sn, 0.01-0.6% Fe, and the balance at least 97% Zr, including impurities, hereinafter designated as Alloy X6. A preferred composition of Alloy X6 has weight percent ranges of about 1.0% Nb, about 0.65% Sn, about 0.1% Fe, and at least 97% Zr, including impurities.

Tin may be decreased if other alloy elements are included to replace the strengthening effect of tin. A second preferred embodiment of Alloy X6 ("Optimized Zirlo") has generally the same weight percentages plus 0.05-0.5% Cr, hereinafter designated as Alloy X6+Cr. A preferred embodiment of Alloy X6+Cr has about 1.0% Nb, about 0.65% Sn, about 0.1% Fe and about 0.2% Cr.

Alloy X6 provides substantial improvements in comparison to Standard ZIRLO over the prior art as it relates to corrosion resistance in a nuclear reactor.

Weld-Corrosion Resistance In a typical nuclear fuel assembly large numbers of fuel rods are included. In each fuel rod nuclear fuel pellets are placed within cladding tubes that are sealed by end caps such that the end caps are welded to the cladding. The end cap-cladding weld, however, is susceptible to corrosion to an even greater extent than the non-welded cladding itself, usually by a factor of two.

Zirconium alloys that include chromium show increased weld corrosion resistance. Thus, the addition of chromium in a zirconium alloy includes substantial advancement over prior zirconium alloys that do not include chromium.

Multiplicities of alloys were tested for their effect on weld corrosion, as shown in Table 4. Several alloys were tested for their effect on laser strip welds in a 680° F. water autoclave test for an 84 day period. Some of these alloys had chromium, while the other alloys did not include chromium except in unintentional trace amounts. Still other alloy tube welds were tested in the form of magnetic force welds in an 879-day 680° F. water autoclave test. Each weld specimen placed in the two autoclave tests contained the weld and about 0.25 inches of an end plug and tube on either side of the weld. Separate same length tube specimens without the weld were also included in the test. The weight gain data were collected on the weld and tube specimens. The ratio of the weld corrosion to the non-weld corrosion was determined either from the weight gain data or the metallographic oxide thickness measurements at different locations on the specimen.

TABLE 4

| Alloy Name | Composition by weight % | Weld/Base Corrosion Ratio |
|---|---|---|
| LASER STRIP WELDS | | |
| Standard ZIRLO | Zr—0.95Nb—1.08Sn—0.11Fe | 2.07 |
| Zr—Nb | Zr—1.03Nb | 2.307 |
| Low-Sn ZIRLO | Zr—1.06Nb—0.73Sn—0.27Fe | 1.71 |
| Standard ZIRLO/590° C. RXA | Zr—0.97Nb—0.99Sn—0.10Fe | 2.094 |
| Alloy A | Zr—0.31Nb—0.51Sn—0.35Fe—0.23Cr | 1.333 |
| MAGNETIC FORCE TUBE WELDS | | |
| Optin Zr-4 | Zr—1.35Sn—0.22Fe—0.10Cr | 0.805 |
| Zr-4 + Fe | Zr—1.28Sn—0.33Fe—0.09Cr | 0.944 |
| Zr—2P | Zr—1.29Sn—0.18Fe—0.07Ni—0.10Cr | 1.008 |
| Alloy C | Zr—0.4Sn—0.5Fe—0.24Cr | 0.955 |
| Alloy E | Zr—0.4Nb—0.7Sn—0.45Fe—0.03Ni—0.24Cr | 1.168 |

As shown in Table 4, the ratios of the zirconium alloys not having chromium had a weld to base metal corrosion ratio of 1.71 or greater. In contrast, the zirconium alloys containing chromium had a maximum ratio of 1.333 or lower. The chromium additions reduce the ratio of weld corrosion relative to that of the base metal. Thus, the addition of chromium significantly reduces weld corrosion, thereby increasing the safety, cost and efficiency of the nuclear fuel assembly.

The differences in weld versus base metal corrosion may be explained by differences in vacancy concentration. The weld region is heated to high temperature during welding, and cools at a faster rate than the base material. In a typical increase of temperature, the vacancies in the metal increase exponentially with the temperature. A fraction of the atomic vacancies introduced during the temperature increase are quenched during the cooling of the weld and, as a result, the vacancy concentration is higher in the weld region. Thus, the vacancy concentration is higher in the weld than the heat affected regions of the non-weld region. Since waterside corrosion of zirconium alloys is postulated to occur by vacancy exchange with oxygen ions, increased vacancy concentration in the weld region can increase vacancy/oxygen exchange and thereby increase corrosion in the weld region if the vacancies are not pinned by an alloying element. This exchange will be reduced resulting in improvement of corrosion resistance of the weld. Due to a high solubility of chromium in beta zirconium (about 47% weight percent), chromium is an effective solid solution element to pin the vacancies in the beta phase and thereby decrease the corrosion enhancement due to oxygen ion exchange with supersaturated vacancies in the quenched weld region.

While a full and complete description of the invention has been set forth in accordance with the dictates of the patent statutes, it should be understood that modifications can be resorted to without departing from the spirit hereof or the scope of the appended claims. For example, the time for the intermediate anneals can vary widely while still maintaining the spirit of the invention.

What is claimed is:

1. A method of making a zirconium based alloy article which exhibits one of improved corrosion resistance and improved creep resistance for use in an elevated temperature environment of a nuclear reactor, comprising the steps:
    (a) combining
        0.4 to 1.5 weight percent niobium,
        0.4 to 0.8 weight percent tin,
        0.05 to 0.3 weight percent iron,
        0.0 to 0.5 weight percent chromium, and
        the balance at least 97 weight percent zirconium including impurities to provide an alloy mixture;
    (b) melting the alloy mixture to produce a melted alloy material;
    (c) forging the melted alloy material to produce a forged alloy material;
    (d) quenching the forged alloy material to produce a quenched alloy material;
    (e) rolling the quenched alloy material to produce a rolled alloy material;
    (f) annealing the rolled alloy material to produce an annealed alloy material;
    (g) following completion of steps (b), (c), (d), (e) and (f), subjecting the annealed alloy material to a final heat treatment selected to provide a zirconium-based alloy exhibiting one of improved corrosion resistance and improved creep resistance,
    wherein for providing the zirconium-based alloy exhibiting improved corrosion resistance, the annealed alloy material is subjected to a final heat treatment of partial recrystallization to produce an amount of recrystallization from about 15% to 20% with the remainder being stress relief annealed, and
    wherein for providing the zirconium-based alloy exhibiting improved creep resistance, the annealed alloy material is subjected to a final heat treatment of partial recrystallization to produce an amount of recrystallization from about 80% to 95% recrystallization with the remainder being stress relief annealed.

2. The method of making the zirconium based alloy of claim 1, wherein the alloy has a composition of about:
    0.4 to 1.5 weight percent niobium,
    0.6 to 0.7 weight percent tin,
    0.05 to 0.3 weight percent iron,
    the balance at least 97 weight percent zirconium, including impurities.

3. The method of making the zirconium based alloy of claim 1, wherein the alloy has a composition of about:
    0.4 to 1.5 weight percent niobium,
    0.61 to 0.69 weight percent tin,
    0.05 to 0.3 weight percent iron,
    the balance at least 97 weight percent zirconium, including impurities.

4. The method of making the zirconium alloy of claim 1, wherein the alloy further comprises:
    0.05 to 0.5 weight percent chromium.

* * * * *